(12) United States Patent
Fischer et al.

(10) Patent No.: US 10,687,658 B2
(45) Date of Patent: Jun. 23, 2020

(54) BEVERAGE PREPARATION DEVICE WITH DISK VALVE AND OPERATING METHOD

(71) Applicant: Eugster/Frismag AG, Amriswil (CH)

(72) Inventors: Daniel Fischer, Romanshorn (CH); Remo Sonderergger, Tägerwilen (CH)

(73) Assignee: Eugster/Frismag AG, Amriswil (CH)

( * ) Notice: Subject to any disclaimer, the term of this patent is extended or adjusted under 35 U.S.C. 154(b) by 253 days.

(21) Appl. No.: 15/768,580

(22) PCT Filed: Aug. 31, 2016

(86) PCT No.: PCT/EP2016/070470
§ 371 (c)(1),
(2) Date: Apr. 16, 2018

(87) PCT Pub. No.: WO2017/063784
PCT Pub. Date: Apr. 20, 2017

(65) Prior Publication Data
US 2018/0289206 A1  Oct. 11, 2018

(30) Foreign Application Priority Data
Oct. 16, 2015 (DE) .......................... 10 2015 117 628

(51) Int. Cl.
*A47J 31/44* (2006.01)
*A47J 31/46* (2006.01)
*F16K 17/12* (2006.01)

(52) U.S. Cl.
CPC .......... *A47J 31/4489* (2013.01); *A47J 31/46* (2013.01); *A47J 31/465* (2013.01); *F16K 17/12* (2013.01)

(58) Field of Classification Search
CPC ...... A47J 31/4489; A47J 31/46; A47J 31/465; F16K 17/12
See application file for complete search history.

(56) References Cited

U.S. PATENT DOCUMENTS 7,178,452 B2 * 2/2007 Fischer ............... A47J 31/40
99/280
9,803,759 B2 * 10/2017 Bachofer ............. F16K 27/045
(Continued)

FOREIGN PATENT DOCUMENTS

DE    2753264 A1    5/1979
DE    4427745 A1    2/1996
(Continued)

OTHER PUBLICATIONS

International search report for patent application No. PCT/EP2016/070470 dated Aug. 31, 2016.

*Primary Examiner* — Ryan J. Walters
(74) *Attorney, Agent, or Firm* — Bachman and LaPointe PC; George Coury

(57) ABSTRACT

A beverage preparation device (1) having a disk valve (6), comprising a valve housing (12) and a disk stack (7) arranged therein, having a cover disk (8) that has at least one fluid opening, configured as a fluid inlet opening, for fluid (5), in particular water and/or steam, and having at least one control disk (10) that is arranged on a side of the cover disk (8) facing away from an outer end side of the cover disk (8), wherein the control disk (10) is rotatable, manually and/or by means of a drive, about an axis of rotation (R) relative to the cover disk (8) between different selection positions, wherein a pressure chamber (15) is formed outside the fluid opening (11), within which pressure chamber (15) a contact pressure (P) is exertable, by means of the fluid (5) flowing therethrough, on the outer end side (14) of the cover disk (9) along the axis of rotation (R) in the direction of the control disk (10), and wherein the pressure chamber (15) is bounded in the radial direction with respect to the axis of rotation (R) by an elastomer seal (13), which is supported on the cover disk (8) in the axial direction, and wherein a pressure-chamber cross-sectional area enclosed by the elastomer seal (Continued)

(13) and/or the pressure-surface portion (17), able to be loaded with hydraulic pressure, of the outer cover disk (8) next to the fluid opening (11) corresponds to at least 20% of the axial projection surface of the cover disk (8), and/or is greater than a fluid-opening cross-sectional area of the fluid opening (11).

21 Claims, 1 Drawing Sheet

(56) References Cited

U.S. PATENT DOCUMENTS

2003/0150333 A1\* 8/2003 Fischer .................. A47J 31/40
99/279
2015/0233483 A1\* 8/2015 Bachofer ............ F16K 11/0743
137/625.15

FOREIGN PATENT DOCUMENTS

| DE | 102008041122 A1 | 2/2010 |
| EP | 1300105 A1 | 4/2003 |
| EP | 1916459 A2 | 4/2008 |
| WO | 2014072379 A1 | 5/2014 |

\* cited by examiner

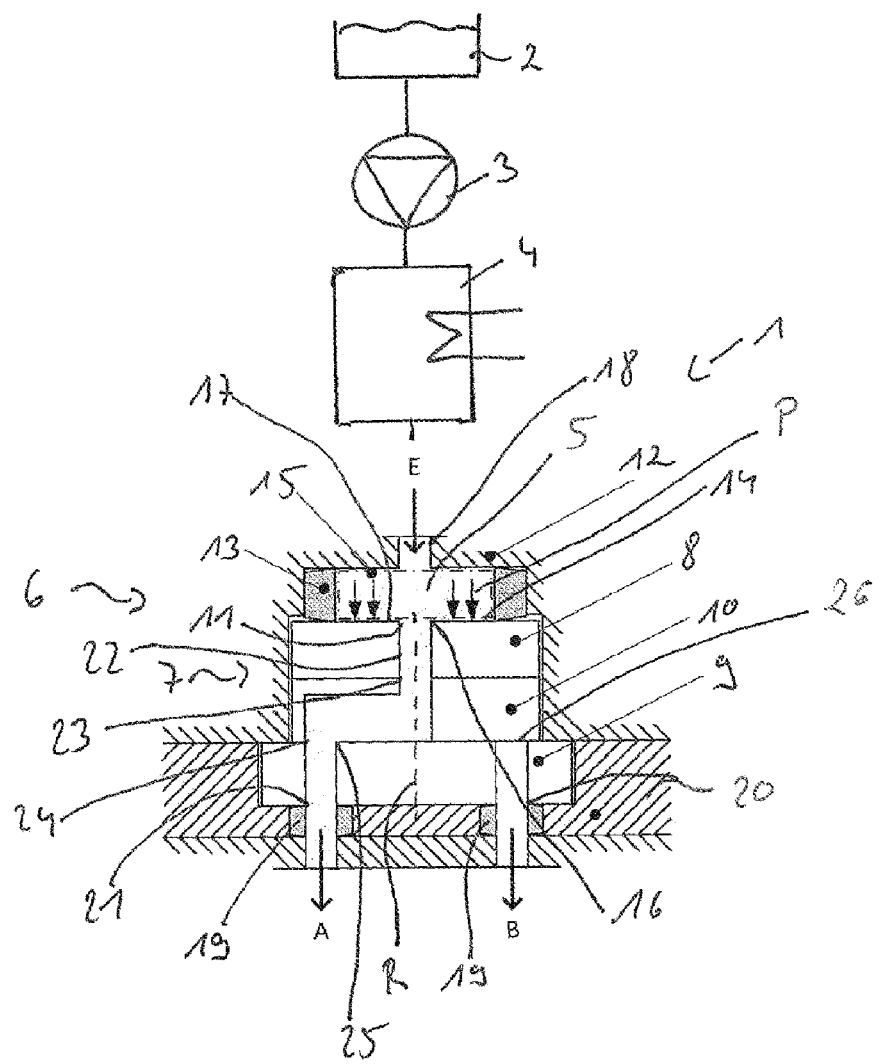

BEVERAGE PREPARATION DEVICE WITH DISK VALVE AND OPERATING METHOD

BACKGROUND OF THE INVENTION

The invention relates to a beverage preparation device, in particular a coffee machine, even more preferably having a heating and/or foaming device for milk, having a disk valve, comprising a valve housing and a disk stack arranged therein, having a, preferably ceramic, cover disk that has at least one fluid opening, preferably configured as a fluid inlet opening, for fluid, in particular water and/or steam, and having at least one control disk that is arranged on a side of the cover disk facing away from an outer end side of the cover disk, wherein the control disk is rotatable, manually and/or by means of a drive, about an axis of rotation relative to the cover disk between different selection positions (in order to set different fluid flows). Thus, by means of the control disk, rotation-angle-dependent selection positions of the disk valve configured as a selector valve are settable, wherein, depending on the rotation angle setting, ducts or passages of the valve are open or closed.

The invention also relates to an operating method.

In beverage preparation devices, in particular coffee machines with a milk heating and/or foaming function, ceramic disk valves comprising a disk stack are used, which can, as selector valves, connect a selected drain line of a hot-water and/or steam generator to a selected feed line of a functional element, for example a nozzle, in a rotation-angle-dependent manner. The known ceramic disk valves in beverage preparation devices generally consist of two ceramic disks, arranged in a stationary manner, with passage openings and a control disk arranged in a sandwiched manner between the outer rotationally fixed ceramic disks, said control disk being assigned an electromotive drive in order for it to be possible to rotate the control disk relative to the stationary disks and thus for it to be possible to perform relative rotation-angle settings, wherein different fluid paths are open and/or closed in the different rotation angle settings.

EP 1 300 105 B1 describes that the ceramic disks are force-loaded toward one another by means of a spring, in order to ensure sufficient tightness.

EP 1 916 459 B1 likewise describes a beverage preparation device having a disk valve. In the known control valve, the cross-sectional area of the feed and drain lines corresponds to the cross-sectional areas of the fluid openings, assigned thereto, in the stationary ceramic disks.

DE 44 27 745 A1 discloses a multidisk distribution valve for coffee or espresso machines, in which, axially next to a cover disk, a sealing element having through-openings is arranged, which are aligned with fluid openings in the cover disk. In this case, the cross-sectional area of the through-openings in the sealing element is slightly larger than the cross-sectional area of the assigned fluid opening in the cover disk. Formed on the sealing element in the region of the through-openings are sealing lips which are intended to ensure efficient contact pressure of the sealing disk against the cover disk.

As further prior art, DE 10 2008 041 122 A1 and DE 27 53 264 A1 are mentioned.

In the known ceramic disks, the contact pressure and thus the sealing force is constant in all operating situations and can decrease over the lifetime of the beverage preparation device on account of dwindling spring forces of pressure springs that are used, and this can result in tightness problems between the individual disks or of the ducts formed therein.

SUMMARY OF THE INVENTION

Proceeding from the abovementioned prior art, the invention is based on the object of specifying a beverage preparation device having an improved disk valve, which adapts automatically to different operating states of the beverage preparation device and ensures reliable tightness over the lifetime of the beverage preparation device.

The object is also to specify an operating method for a correspondingly improved beverage preparation device.

With regard to the beverage preparation device, this object is achieved by the features as disclosed herein. Here, the invention provides for a pressure chamber to be formed outside the fluid opening, within which pressure chamber a contact pressure is exertable, by means of the fluid flowing therethrough, in particular in all selection positions of the disk valve, on the outer end side (facing away from the control disk) of the cover disk along the axis of rotation in the direction of the control disk, and for the pressure chamber to be bounded in the radial direction with respect to the axis of rotation by an elastomer seal, configured preferably as a circumferentially closed ring seal, which is supported on the cover disk in the axial direction. In this case, it is crucial that the contact pressure that is able to be generated by the fluid flowing through the pressure chamber and thus the hydraulic (contact) pressure force acting on the cover disk in a region next to the fluid opening be sufficiently great to ensure a sufficient or desired sealing action between the cover disk and the control disk (and optionally further disks). In order to achieve this, provision is made according to the invention for a pressure-chamber cross-sectional area enclosed by the elastomer seal and/or the pressure-surface portion, able to be loaded with hydraulic pressure, of the outer cover disk next to the fluid opening to correspond to at least 20% of the axial projection surface of the cover disk, and/or for the pressure-chamber cross-sectional area and/or the pressure-surface portion, able to be loaded with hydraulic pressure, of the outer cover disk next to the fluid opening to be greater than, in particular at least twice as large as, a fluid-opening cross-sectional area of the fluid opening.

With regard to the operating method, the object is achieved by the features as disclosed herein. According to the invention, provision is made for the pressure chamber to be loaded with fluid and as a result for the cover disk to be pressed axially in the direction of the control disk.

Alternative configurations of the invention are specified in the dependent claims.

The scope of the invention includes all combinations of at least two features disclosed in the description, the claims and/or the figures. To avoid repetitions, features disclosed in relation to the device are also intended to count as disclosed and claimable in relation to the method. Likewise, features disclosed in relation to the method are also intended to count as disclosed and claimable in relation to the device.

The invention is based on the concept of forming, in a region upstream of a fluid opening in a cover disk of the disk stack, a pressure chamber which extends in a radial direction over the end-side edge of the fluid opening, configured preferably as a fluid inlet opening (inflow opening), in particular for water and/or heating steam, such that the fluid can be supported axially (indirectly or directly) on the outer end side of the cover disk in a region next to the fluid opening and can load said cover disk with a hydraulic contact pressure in the direction of the control disk, said pressure then in turn ensuring a sufficient sealing force with which the cover disk is pressed against the control disk. The abovementioned pressure chamber, which is preferably bounded by the valve housing on the axial side facing away from the cover disk, is bounded toward the outside in a radial direction by an elastomer seal, configured in particular as a circumferentially closed ring seal, which is supported on the cover disk in an axial direction. In the process, the elastomer seal preferably exerts a base load, or basic pressure, brought about by its, preferably realized, pretension or seal pressure, on the cover disk, this ensuring a degree of pressurization even in operating states of the beverage preparation device in which the pressure chamber is not loaded with hydraulic fluid pressure, in particular by means of a pump or other delivery means of the beverage preparation device. What is essential is that, as a result of the provision according to the invention of the pressure chamber in a region next to the cover disk, hydraulic fluid pressurization of the cover disk in the direction of the control disk is possible, such that the contact pressure acting on the cover disk is not constant, as in the prior art, in all operating states of the beverage preparation device, but is directly dependent, in particular proportional to the hydraulic pressure of the fluid located in the pressure chamber, in particular water and/or steam, such that the sealing force is adapted automatically to the particular operating situation. Specifically, if the fluid pressure is increased, the contact pressure also rises automatically and thus the sealing force on the disks, resting against one another, of the disk stack, such that whenever an increased sealing force is desired or necessary on account of an increased fluid pressure, this increased sealing force is generated automatically via the fluid itself. As already mentioned, it is expedient for the cover disk to be an inflow disk, i.e. that fluid, in particular water, preferably hot water and/or steam from a hot-water and/or steam generator, in particular a flow heater, or alternatively cooled water from a flow cooler, for producing cold beverages, flow in via the fluid inlet opening, in order to ensure the hydraulic pressure in the pressure chamber and thus the contact pressure on the cover disk and thus in turn to ensure the tightness. However, it is also possible in principle to arrange the pressure chamber on the outlet side, when sufficient dynamic pressure, or hydraulic pressure, which is responsible for pressurizing the cover disk in the direction of the adjacent, preferably directly abutting control disk, is also sure to occur in an output-side pressure chamber during operation of the beverage preparation device.

Particularly preferably, the elastomer seal is designed here for the pressures that arise during operation, such that it can (elastically or dynamically) compensate a height difference resulting from hydraulic pressurization of the pressure chamber, in particular a height increase of the pressure chamber in the axial direction.

In order to ensure a sufficiently great (hydraulic) contact pressure and thus for a high sealing force, provision is made according to the invention for a cross-sectional area (extending in a radial direction or located in a radial plane with respect to the axis of rotation) enclosed by the elastomer seal and/or a pressure-surface portion (to be more precise the axial projection surface thereof), able to be axially loaded indirectly or directly with fluid pressure, of the outer end side of the cover disk next to the fluid opening to correspond to at least 20%, preferably at least 30%, even more preferably at least 40%, very particularly preferably at least 50% of the axial projection surface of the cover disk, and/or for the pressure-chamber cross-sectional area (extending in a radial direction with respect to the axis of rotation) and/or the pressure-surface portion (i.e. the axial projection surface thereof), able to be loaded with hydraulic pressure with fluid from the pressure chamber, of the outer cover disk next to the fluid opening to be greater than a fluid-opening cross-sectional area (to be more precise than the axial projection surface of the fluid opening), preferably at least twice as large, particularly preferably at least three times as large, even more preferably at least five times as large, very particularly preferably at least ten times as large, as this fluid-opening cross-sectional surface or axial projection surface.

In a development of the invention, provision is advantageously made for the disk valve to be assigned means for varying the hydraulic pressure of the fluid in the pressure chamber in order to simultaneously set or vary the contact pressure on the outer end side of the cover disk, in particular comprising at least one delivery device arranged upstream of the disk stack in the direction of flow, preferably a delivery pump, for example an oscillating pump.

In order that a contact pressure is exertable on the outer end side of the cover disk indirectly or preferably directly by the fluid present in the pressure chamber, provision is made in a development of the invention for an axial projection surface, as seen along the rotation axis, of the pressure chamber to coincide at least partially with an axial projection surface of the cover disk in a region next to the fluid inlet opening, wherein the axial sealing force resulting from the contact pressure rises with increasing overlap.

As already indicated, it is particularly preferred for the fluid enclosed by the elastomer seal to contact or pressurize the cover disk directly in a region next to the fluid opening, to which end it is necessary for the outer end side of the pressure disk to directly bound the pressure chamber in an axial direction with a pressure-face portion enclosed by the elastomer seal. Also feasible in principle is an alternative embodiment in which a layer, for example made of elastomer material, is formed between the fluid present in the pressure chamber and the outer end side, wherein this layer (pressure-transmission layer) can be configured such that it is deformable on account of the hydraulic pressure in the pressure chamber and thus a contact pressure is transferable or transmissible to the outer end face of the cover disk. Such a cover layer can be formed for example in one piece with the annular elastomer seal, which bounds the pressure chamber toward the outside in a radial direction. Such a layer, formed in particular in one piece with the elastomer seal, can also be provided on that side of the pressure chamber that is arranged from the outer end side of the cover disk, in particular between the fluid located in the pressure chamber and the valve housing. However, it is particularly preferred here, too, for the valve housing to directly bound the pressure chamber in the axial direction.

With regard to the arrangement of the elastomer seal, configured in particular as a ring seal, elastomer seal that serves to radially bound the pressure chamber (with respect to the axis of rotation), it is preferred to arrange said elastomer seal concentrically with the axis of rotation.

In principle, it is preferred for a pressure-chamber inner wall, formed by the elastomer seal, (in particular inner lateral surface) to be arranged at a radial spacing from a fluid-opening edge of the fluid opening in the cover disk.

Overall, it is advantageous if only a housing-side feed line leads out into the pressure chamber or alternatively a housing-side drain lead leads out into the latter, wherein it is also possible in principle to supply the pressure chamber with the aid of separate feed lines or, in the alternative embodiment, to drain fluid out of the pressure chamber via two separate fluid lines. In the event that a plurality of (different) feed lines to be selected by means of the disk valve are provided, it is possible to provide several, in particular concentrically nested pressure chambers, in particular by way of the, for example concentric arrangement of at least two ring seals, wherein each pressure chamber is then preferably assigned a fluid opening, then assigned as fluid inlet opening, in the cover disk. Preferably, in this case, the pressure chambers are designed such that a contact pressure is exertable on the outer end side of the cover disk in a region next to the respective fluid opening in the cover disk by at least one of the pressure chambers, preferably by all the pressure chambers or the fluid present in each case. Such a configuration is also realizable in an analogous manner with a plurality of, preferably coaxially nested, pressure chambers provided on the outlet side, wherein two adjacent pressure chambers are sealed off from one another in a radial direction via an, in particular inner radial seal, wherein, analogously to an inlet-side arrangement of a plurality of pressure chambers, the plurality of ring seals are supported axially on the cover disk and axially, preferably opposite one another, on the valve housing.

Overall, it is particularly advantageous if a fluid opening in the cover disk, in particular the only fluid opening in the cover disk, is arranged centrically, i.e. at the center of the cover disk (through which the axis of rotation passes). It is also preferred to arrange a feed-line or drain-line opening assigned to this fluid opening in the housing in a manner axially aligned therewith, i.e. likewise concentrically.

An embodiment in which the cross-sectional area of the pressure chamber and/or the pressure-surface portion enclosed by the elastomer seal, in particular the outer end side of the cover disk, (to be more precise the respective axial projection surface) is selected from a range of values between 30 mm$^2$ and 120 mm$^2$, preferably between 40 mm$^2$ and 100 mm$^2$, very particularly preferably between 50 mm$^2$ and 80 mm$^2$, or is 60 mm$^2$, is particularly preferred. In the case of an exemplary area of 60 mm$^2$ and an assumed maximum pressure of the fluid present in the pressure chamber, the contact pressure acting on the cover disk is 120 bar. Usually, fluid pressures in the pressure chamber of between about 1 bar and 20 bar, in particular between 2 bar and 19 bar, preferably between 2 bar and 16 bar, should be anticipated.

An embodiment of the beverage preparation device in which, in addition to the cover disk and the rotatably drivable control disk, the disk stack has a rear disk, wherein the cover disk and rear disk receive the control disk in a sandwiched manner between one another, is particularly preferred. Preferably, the cover disk and rear disk are arranged in a rotationally fixed manner, i.e. in a non-rotatable manner. In this case, the cover disk preferably forms the inflow disk (inflow side) of the disk valve and the rear disk forms the outflow side, wherein, as already mentioned, a reverse flow is also possible, i.e. the rear disk, or an opening arranged therein, is supplied with fluid, in particular from a flow heater, and the cover disk with the cover-disk-side pressure chamber is arranged on the outlet side. It is also possible for one of the disks to serve as a combined inflow and outflow disk, in particular for a drainage connection.

The rear disk, preferably arranged in a rotationally fixed manner, is supported, preferably indirectly via at least one seal, on the valve housing, wherein the at least one seal seals off an opening in the rear disk. In particular when the rear disk is an outlet-side disk, it preferably comprises more than one fluid opening, in order for it to be possible to supply fluid fed via the cover disk, to be more precise the fluid opening arranged therein, to different functional units, for example a brewing unit and/or a nozzle for milk heating and/or milk foaming. Preferably, a drainage opening is also provided in the rear disk, in order for it to be possible to discharge the fluid arriving at a drainage line.

In order to ensure as symmetrical as possible a contact-pressure force distribution of the hydraulic contact pressure, generated by the fluid located in the pressure chamber, on the cover disk, it is preferred if a pressure-chamber inner wall formed by the elastomer seal and delimiting the pressure chamber radially on the outside, and/or the fluid opening, leading out of the pressure chamber, in the cover disk is/are arranged concentrically with the axis of rotation of the disk valve. In other words, it is thus preferred if the pressure chamber is arranged concentrically with the axis of rotation. Preferably, the elastomer seal bounds a single, in particular the abovementioned, concentric pressure chamber from which a hydraulic contact pressure on the cover disk is able to be generated. An embodiment in which a single fluid opening configured as a through-opening is provided in the cover disk, said fluid opening preferably communicating with a single, cover-disk-side pressure chamber bounded by the elastomer seal, has been found to be particularly advantageous.

The invention also relates to a method for operating a beverage preparation device configured according to the concept of the invention. According to the invention, provision is made for the pressure chamber to be loaded with fluid and as a result for the cover disk to be pressed axially in the direction of the control disk (and a rear disk possibly in turn adjacent thereto). In this case, fluid loading takes place, when the cover disk is arranged on the feed-line side, via a connecting line, or fluid line, in particular in the valve housing, wherein, in the case of the pressure chamber being arranged on the outlet side, the pressurization of the pressure chamber takes place preferably via the fluid opening in the cover disk.

In a development of the invention, provision is advantageously made for the contact pressure on the cover disk, and thus the sealing force with which the cover disk is pressed against the adjacent control disk, to change in proportion with the hydraulic pressure of the fluid in the pressure chamber.

It is particularly expedient for an axial extent of the pressure chamber along the axis of rotation to increase with increasing fluid pressure, and for the axial growth, i.e. the difference in axial extent, to be compensated by expansion of the elastomer seal, i.e. for the elastomer seal to be pressed axially independently of the fluid pressure that arises and to ensure that the pressure chamber is sealed off in that the elastomer seal continues to be supported with contact pressure axially on the cover disk and to be supported, preferably on the opposite side, on the valve housing.

BRIEF DESCRIPTION OF THE DRAWINGS

Further advantages, features and details of the invention can be gathered from the following description of a preferred exemplary embodiment and with reference to the drawing.

The latter shows in the single FIG. 1 a schematic illustration of a beverage preparation device having a disk valve comprising a pressure chamber.

FIG. 1 schematically shows a beverage preparation device 1, for example a coffee capsule machine or a fully automated coffee machine.

DETAILED DESCRIPTION

The latter comprises water supply means 2, here for example in the form of a water tank (additionally or alternatively a fresh water connection), from which water is delivered to a flow heater 4 (additionally or alternatively to a flow cooler) by means of a pump 3. With the aid of the shown flow heater, depending on activation, hot water or steam is generated. Of course, it is also possible to spread the hot-water and steam generation over several flow heaters.

In the specific exemplary embodiment in any case, fluid 5, in the form of hot water or steam, flows out of the flow heater 4 to a selector valve configured as a disk valve 6, which passes the fluid flow to different consumers, for example a brewing chamber and/or a steam nozzle, preferably a milk heating and/or foaming device, specifically via valve outlets A, B.

The disk valve 6 comprises conventionally a disk stack 7, consisting of three ceramic disks, specifically an outer cover disk 8 arranged in a rotationally fixed manner, a likewise outer rear disk 9 facing away therefrom and arranged in a rotationally fixed manner, and a control disk 10 accommodated in a sandwiched manner in between, which is rotatable relative to the cover disk 8 and the rear disk 9 by means of a drive (not shown) in order to select different fluid paths.

Located in the cover disk 8 is a fluid opening 11, configured as a fluid inlet opening, which is arranged concentrically with an axis of rotation R about which the control disk 10 is rotatable. Via the fluid opening 11, fluid 5, i.e. specifically water or steam, is fed to the disk stack 7, and depending on the rotation-angle position of the control disk 10 about the axis of rotation R, is passed to the outlet A or B and thus to different functional units.

The disk stack 7 is arranged within a multipart valve housing 12, wherein the cover disk 8 is assigned an elastomer seal 13 in the form of a ring seal, which is supported on an upper (in the drawing plane) outer end side 14, facing away from the other disks, of the cover disk 8. Axially on the opposite side, the elastomer seal 13 is supported on the valve housing 12.

Formed radially within the elastomer seal 13, or bounded in a radial direction thereby, is a pressure chamber 15, which is assigned to the cover disk 8 inasmuch as the fluid 5 present therein, i.e. flowing therethrough, can exert a contact pressure P on the cover disk 8 in an axial direction parallel to the axis of rotation R.

To this end, the pressure chamber 15 extends in a radial direction beyond an (outer) fluid-opening edge 16 of the fluid opening 11. In the specific exemplary embodiment, the cover disk 8, to be more precise the outer end side 14 thereof, bounds the pressure chamber 15 directly, specifically with a pressure-surface portion 17 which is arranged next to the fluid-opening edge 16 and the surface extent of which is much greater than the surface extent of the cross-sectional area (to be more precise the axial projection surface) of the fluid opening 11, i.e. the inlet into a fluid duct or a bore in the cover disk 8.

Axially on the opposite side from the pressure-surface portion 17, the pressure chamber 15 is bounded directly, in the specific exemplary embodiment, by the valve housing 12, wherein, as mentioned, the sealing or bounding is realized in a radial direction via the elastomer seal 13, which is under corresponding seal pressure.

The pressure chamber 15 is supplied with fluid 5 via a connecting line 18, in the form of an inlet line, in the valve housing 12, said connecting line 18 being connected in a fluid-conducting manner to the pump 3 and to the flow heater 4.

On the side facing away from the elastomer seal 13, the disk stack 7, specifically the rear disk 9, is supported on the housing 12 via outlet seals 19 in the form of ring seals, and thus seals off the two outlet openings 20, 21 in the rear disk 9.

During operation of the beverage preparation device 1, the hydraulic pressure of the fluid 5 changes, for example when the delivery pump 3 is started or in order to set different fluid volume flows (for example for setting the temperature of the fluid), in a manner controlled via a logic unit that controls the pump 3. As a consequence of this, the contact pressure A and the resultant sealing force with which the cover disk 8 is pressed onto the control disk 10 and the latter is in turn pressed onto the control disk 9 changes. From the arrangement according to the invention of a pressure chamber 15, there thus results a dynamic sealing force behavior of the disk valve 7.

The fluid opening 11 is assigned an axial through-duct 22 in the cover disk 8, via which through-duct 22 the fluid 5 can flow to a control-disk opening 23, wherein a control-disk outlet opening 24, which is permanently connected in a fluid-conducting manner to the control-disk opening 23, is offset in a radial direction with respect to the control-disk opening 23. Depending on the rotation-angle position of the control disk 10, the control-disk outlet opening 24 is aligned with a first inlet opening 25 of the rear disk 9 or with a second inlet opening 26 of the rear disk 9, in order in this way for it to be possible to supply the different outlets A and B and thus different functional units with fluid 5 with fluid 5 depending on the rotation-angle position of the control disk 10.

REFERENCE SIGNS

1 Beverage preparation device
2 Water supply means
3 Pump
4 Flow heater
5 Fluid
6 Disk valve
7 Disk stack
8 Cover disk
9 Rear disk
10 Control disk
11 Fluid opening
12 Valve housing
13 Elastomer seal
14 Outer end side
15 Pressure chamber
16 Fluid-opening edge
17 Pressure-surface portion of the outer end side
18 Connecting line
19 Outlet seat
20 Outlet opening
21 Outlet opening
22 Through-duct
23 Control-disk opening
24 Control-disk outlet opening
25 First inlet opening
26 Second inlet opening
A Valve outlet
B Valve outlet R Axis of rotation
P Contact pressure

The invention claimed is:

1. A beverage preparation device (1) having a disk valve (6), comprising a valve housing (12) and a disk stack (7) arranged therein, having a cover disk (8) that has at least one fluid opening, configured as a fluid inlet opening, for fluid (5), in particular water and/or steam, and having at least one control disk (10) that is arranged on a side of the cover disk (8) facing away from an outer end side of the cover disk (8), wherein the control disk (10) is rotatable, manually and/or by means of a drive, about an axis of rotation (R) relative to the cover disk (8) between different selection positions, wherein a pressure chamber (15) is formed outside the fluid opening (11), within which pressure chamber (15) a contact pressure (P) is exertable, by means of the fluid (5) flowing therethrough, on the outer end side (14) of the cover disk (8) along the axis of rotation (R) in the direction toward the control disk (10), and wherein the pressure chamber (15) is bounded in the radial direction with respect to the axis of rotation (R) by an elastomer seal (13), which is supported on the cover disk (8) in the axial direction, and wherein a pressure-chamber cross-sectional area enclosed by the elastomer seal (13) and/or the pressure-surface portion (17), able to be loaded with hydraulic pressure, of the outer cover disk (8) next to the fluid opening (11) corresponds to at least 20% of the axial projection surface of the cover disk (8), and/or is greater than a fluid-opening cross-sectional area of the fluid opening (11).

2. The beverage preparation device as claimed in claim 1, wherein the disk valve (6) is assigned means for varying the hydraulic pressure of the fluid (5) flowing through the pressure chamber (15) and thus for varying the contact pressure (P).

3. The beverage preparation device as claimed in claim 1, wherein an axial projection surface of the pressure chamber (15) coincides at least partially with an axial projection surface of the cover disk (8) in a region next to the fluid inlet opening.

4. The beverage preparation device as claimed in claim 1, wherein the outer end sides of the cover disk (8) bound the pressure chamber (15) in the axial direction with a pressure-surface portion enclosed by the elastomer seal (13), or wherein a pressure-transmission layer is arranged on a pressure-surface portion (17) of the outer end side of the cover disk (8), said pressure-transmission layer bounding the pressure chamber (15) in the axial direction.

5. The beverage preparation device as claimed in claim 1, wherein the elastomer seal (13) is arranged concentrically with the axis of rotation (R).

6. The beverage preparation device as claimed in claim 1, wherein a pressure-chamber inner wall, formed by the elastomer seal (13), is arranged at a radial spacing from a fluid-opening edge (16).

7. The beverage preparation device as claimed in claim 1, wherein a pressure-chamber cross-sectional area enclosed by the elastomer seal (13) and/or the pressure-surface portion (17), able to be loaded with hydraulic pressure, of the outer cover disk (8) next to the fluid opening (11) corresponds to at least 30% of the axial projection surface of the cover disk (8), and/or wherein the pressure-chamber cross-sectional area and/or the pressure-surface portion (17), able to be loaded with hydraulic pressure, of the outer cover disk (8) next to the fluid opening (11) is at least twice as large as a fluid-opening cross-sectional area of the fluid opening (11).

8. The beverage preparation device as claimed in claim 7, wherein said pressure chamber cross-sectional area (13) and/or said pressure-surface portion (17) corresponds to at least 40% of the axial projection surface of the cover disk.

9. The beverage preparation device as claimed in claim 7, wherein said pressure chamber cross-sectional area (13) and/or said pressure-surface portion (17) corresponds to at least 50% of the axial projection surface of the cover disk.

10. The beverage preparation device as claimed in claim 7, wherein said pressure chamber cross-sectional area and/or said pressure-surface portion (17) is at least three times as large as said fluid-opening cross-sectional area (13) of the fluid opening (11).

11. The beverage preparation device as claimed in claim 7, wherein said pressure chamber cross-sectional area and/or said pressure-surface portion (17) is at least five times as large as said fluid-opening cross-sectional area (13) of the fluid opening (11).

12. The beverage preparation device as claimed in claim 7, wherein said pressure chamber cross-sectional area and/or said pressure-surface portion (17) is at least ten times as large as said fluid-opening cross-sectional area (13) of the fluid opening (11).

13. The beverage preparation device as claimed in claim 1, wherein the control disk (10) is arranged in a sandwiched manner between the cover disk (8) and a rear disk (9) which has at least one opening configured as an outlet, at least two openings for fluid (5) that are in particular each configured as an outlet.

14. The beverage preparation device as claimed in claim 13, wherein the rear disk (9), arranged in a rotationally fixed manner, is supported on the valve housing (12), in particular via at least one seal, on the side of the disk stack (7) facing away from the elastomer seal (13).

15. The beverage preparation device as claimed in claim 1, wherein the elastomer seal (13) is supported on the valve housing (12) on the side facing away from the outer end side, said valve housing (12) bounding the pressure chamber (15) on the pressure-chamber side facing away from the outer end side.

16. The beverage preparation device as claimed in claim 1, wherein a connecting line (18) for introducing or discharging fluid (5) into or out of the pressure chamber (15) is arranged in the valve housing (12), opposite the fluid opening in the cover disk (8).

17. The beverage preparation device as claimed in claim 1, wherein a pressure-chamber inner wall formed by the elastomer seal (13), and/or the fluid opening (11), leading out of the pressure chamber (15), in the cover disk (8) is/are arranged concentrically with the axis of rotation (R), and/or wherein a single fluid opening (11), configured as a through-opening, is arranged in the cover disk (8), and/or wherein a single pressure chamber (15), through which the fluid is able to flow, is bounded by the elastomer seal (13).

18. The beverage preparation device as claimed in claim 1, wherein the elastomer seal (13) is configured as a circumferentially closed ring seal.

19. A method for operating a beverage preparation device (1) as claimed in claim 1, wherein the pressure chamber (15) is loaded with fluid (5) and as a result the cover disk (8) is pressed axially in the direction of the control disk (10).

20. The method as claimed in claim 19, wherein the contact pressure changes in proportion with the hydraulic pressure of the fluid (5) in the pressure chamber (15).

21. The method as claimed in claim 19, wherein an axial extent of the pressure chamber (15) increases with increasing fluid pressure, and the axial growth is compensated by expansion of the elastomer seal (13).

* * * * *